(12) United States Patent
Iaquinangelo

(10) Patent No.: US 7,233,866 B2
(45) Date of Patent: Jun. 19, 2007

(54) DEVICE FOR THE MANAGEMENT OF ELECTRICAL SOCKETS

(76) Inventor: Armando Iaquinangelo, Via Brughiera, 15, Cornaredo (IT) I-20010

( * ) Notice: Subject to any disclaimer, the term of this patent is extended or adjusted under 35 U.S.C. 154(b) by 0 days.

(21) Appl. No.: 10/560,394

(22) PCT Filed: May 6, 2004

(86) PCT No.: PCT/EP2004/004895
§ 371 (c)(1),
(2), (4) Date: Dec. 13, 2005

(87) PCT Pub. No.: WO2004/100335

PCT Pub. Date: Nov. 18, 2004

(65) Prior Publication Data
US 2006/0235632 A1    Oct. 19, 2006

(30) Foreign Application Priority Data
May 9, 2003    (IT) .......................... BG2003A0032

(51) Int. Cl.
*G06F 19/00* (2006.01)
(52) U.S. Cl. ..................... 702/64; 702/58; 702/65
(58) Field of Classification Search .............. 702/57, 702/58, 60, 62, 65, 182–185, 188, 189; 315/246, 315/254, 268, 274; 363/83, 87; 361/62
See application file for complete search history.

(56) References Cited

U.S. PATENT DOCUMENTS

| | | | |
|---|---|---|---|
| 4,807,161 A | * | 2/1989 | Comfort et al. ............ 702/121 |
| 5,003,486 A | * | 3/1991 | Hendel et al. .............. 700/293 |
| 5,151,841 A | | 9/1992 | Knights |
| 5,642,005 A | * | 6/1997 | Pelletier et al. ............... 307/87 |
| 6,038,115 A | | 3/2000 | Kleemeier et al. |
| 2002/0097546 A1 | | 7/2002 | Weinberger |
| 2004/0130835 A1 | * | 7/2004 | Wahlroos et al. ............. 361/2 |

\* cited by examiner

*Primary Examiner*—Bryan Bui

(74) *Attorney, Agent, or Firm*—Connolly Bove Lodge & Hutz, LLP; Larry J. Hume

(57) ABSTRACT

A device for the management of electrical sockets connected to a branch of an AC electrical network includes a monitor circuit arranged to detect a presence or absence of a load connected to one of the sockets, and a voltage level management circuit connected to the branch of the AC electrical network. The voltage management circuit includes a processing unit that processes information provided by the monitor, and an intervention unit is coupled to the branch of the AC electrical network and is controlled by the processing unit. The intervention unit varies an AC voltage level in response to the load.

31 Claims, 3 Drawing Sheets

DEVICE FOR THE MANAGEMENT OF ELECTRICAL SOCKETS

CROSS-REFERENCE TO RELATED APPLICATION

This application is a National Stage entry under the PCT of International Application PCT/EP2004/004895 filed on May 6, 2004. International Application PCT/EP2004/004895 claims priority to Italian application BG2003A00032, filed on May 9, 2003. The entire contents of each of PCT/EP2004/004895 and BG2003A00032 are incorporated herein by reference.

BACKGROUND

The present invention relates to a device for the management of electrical sockets of a domestic or industrial type connected to an a.c. electrical network.

An electrical socket, as is known, constitutes the interface that enables transfer to a generic load of the level of a.c. voltage of the electrical network to which the socket is connected. Of course, the term "generic load" is meant to indicate any operating apparatus connected to the socket, whilst the simple connection accompanied by a state of rest of the apparatus itself constitutes, instead, a state of absence of load. The level of voltage of the a.c. network varies, as is known, according to the sphere considered. Domestic networks, for example, are single-phase networks and are characterized by a voltage of 220 V, whereas, for three-phase industrial networks, it is 380 V. In both of the cases referred to, however, each electrical socket is constantly subjected to said values of a.c. voltage even when no load is applied.

The latter condition appears particularly disadvantageous in terms of safety above all in the domestic context, where there are not commonly envisaged particular external protective devices designed to insulate the live contacts of the socket from the surrounding external environment. For this reason, there may occur serious accidents in the case where persons, above all children, accidentally come into contact with the socket. In such a situation, the human body, behaving like an electrical impedance, is traversed by a current intensity which, according to its value, can lead to serious consequences that range from involuntary contraction of muscles, referred to as tetanization, to death due to electrocution. A constant level of voltage applied to an electrical socket has moreover a second negative aspect linked to the onset of electromagnetic emissions in the proximity of the socket itself. It is in fact known how, in the domestic and industrial environments, electrical cables, sockets, electrical equipment, etc. generate electric and magnetic fields in their vicinity. In Italy, for example, said fields have a characteristic frequency of 50 Hz, i.e., that of the supply networks, and an intensity which, instead, varies according to the wiring systems or to the loads applied.

It may be appreciated, then, how electrical sockets, at least ones in current use, present problems of safety and represent a source of undesirable electromagnetic pollution. Even though the effects on man deriving from the exposure to a.c. magnetic fields is not, in fact, yet totally known and controllable, there is by now recognized the need to limit to the maximum this type of emissions obviously where and when this is possible.

SUMMARY

The main task of what forms the subject of the present invention is to provide a device for the management of electrical sockets connected to a.c. electrical networks which will enable guaranteeing levels of safety that are higher than the currently existing ones.

In the framework of this task, the main purpose of the present invention is to provide a device that will enable management of the voltage level of the individual socket according to the presence/absence of a generic load applied thereto.

Another purpose of the present invention is to provide a device for managing electrical sockets that will enable limitation of the electromagnetic emissions in the proximity of the socket in particular in the absence of a load applied thereto.

A further purpose of the present invention is to provide a device that will enable identification of possible conditions of overload and short circuit and hence will make it possible to intervene accordingly.

Not the least important purpose of what forms the subject of the present invention is to provide a device for managing electrical sockets that will present high reliability, relative ease of manufacture and competitive costs.

The above task, as well as the above and other purposes that will appear more clearly from what follows, is achieved by a device for the management of electrical sockets connected to a branch of an a.c. electrical network for domestic or industrial use, characterized in that it comprises: monitoring means dedicated to detection of the presence/absence of a load connected to the socket; management means for managing the level of voltage in said branch of electrical network comprising a processing unit for processing the information sent by said monitoring means and an intervention unit applied to said branch of electrical network controlled by said processing unit. The device according to the invention is characterized in that said intervention unit comprises means for variation of the level of a.c. voltage according to the conditions of applied load.

The possibility of varying the voltage applied to the socket according to the conditions of load continuously monitored represents the main advantage of the invention. In this way, it is in fact possible to prevent any dangerous accidents from occurring such as the ones mentioned above or again to control and limit the electromagnetic emissions.

DESCRIPTION OF THE DRAWINGS

Further characteristics and advantages of the invention will emerge more clearly from the description of preferred, but non-exclusive, embodiments of the safety device according to the invention, illustrated by way of non-limiting example in the annexed drawings, in which.

DETAILED DESCRIPTION

Figure 2:
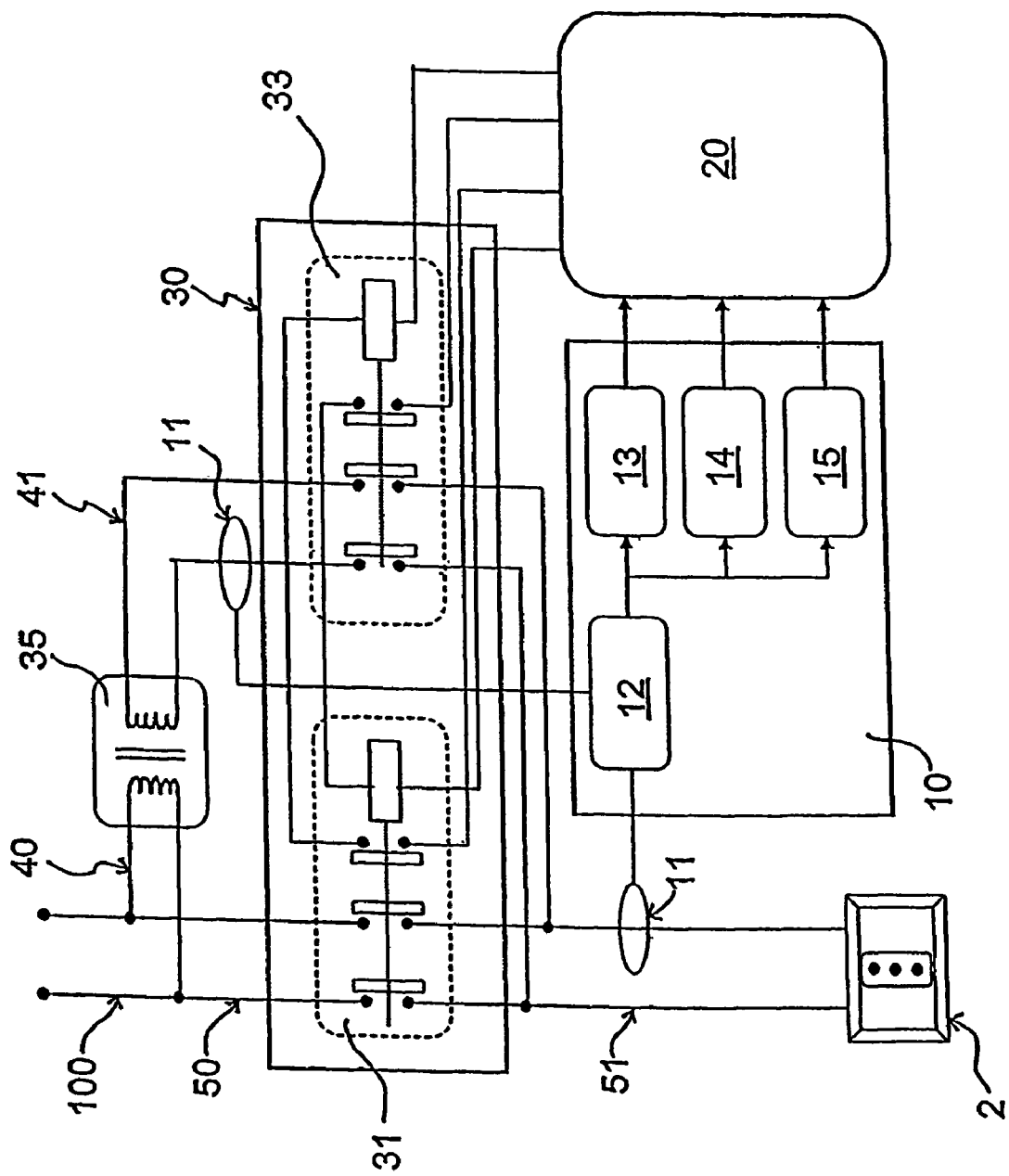
FIG. 2 is a schematic representation of an embodiment of the device for managing electrical sockets connected to a branch of a domestic electrical network, according to the invention.
Figure 3:
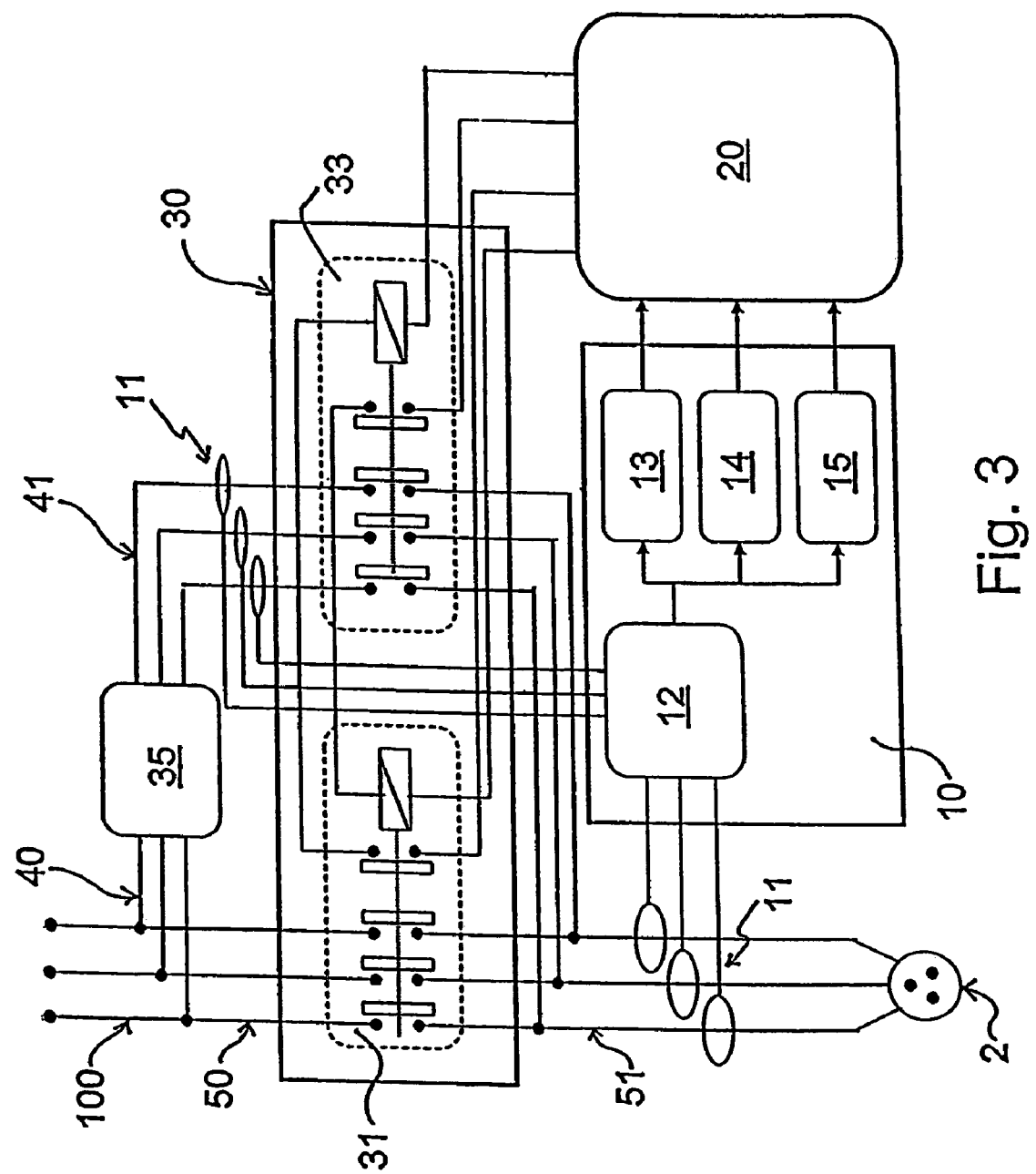
FIG. 3 is a schematic representation of an embodiment of the device for managing electrical sockets connected to a branch of an industrial electrical network, according to the invention.

With reference to the aforementioned figures, the device 1 for the management of electrical sockets 2 is connected to a branch 100 of an a.c. electrical network, which may be a single-phase network in a domestic environment (FIG. 2) or a three-phase network in an industrial environment (FIG. 3). The device 1 comprises monitoring means 10 dedicated to detection of the presence/absence of the load or, more in general, to detection of the conditions of the load itself, as will be emphasized hereinafter. The device 1 further comprises management means 200 for managing the level of voltage present in the branch 100 of the electrical network to which the socket 2 is connected. Said management means 200 comprise a processing unit 20 for processing the information that is sent by the monitoring means 10, and an intervention unit 30, actuated and controlled by said processing unit 20. The intervention unit 30, according to the invention, in fact enables variation of the level of a.c. voltage applied to the socket 2 according to the presence/absence of the applied load, as well as of possible and undesirable short-circuit or overload conditions. In the absence of the load, if the normal operating voltage applied to the socket is, for example, 220 V, the intervention unit 30 enables reduction of the voltage, for example, to 24 V, thus rendering the socket itself safe and at the same time reducing the electromagnetic emissions.

This low-voltage value to which the socket is reduced is chosen so as to guarantee the complete protection of persons in the case of accidental contact with the socket. The human body has in fact an impedance that can reasonably, or anyway in the most frequent cases, be considered of the order of thousands of ohms. It may thus be appreciated how a voltage of 24 V applied to a person will produce current intensities of a value much lower than 100 mA, which is currently considered as the threshold value above which currents can cause serious harm to a person. The monitoring means 10, according to the invention, detect the conditions of the applied load via a measurement of the intensity of the current that circulates in the branch 100 of the electrical network. For this reason, they comprise current sensor means 11, such as, for example, amperometric transformers capable of producing at output a first signal representing the current circulating in the branch 100.

With reference to FIG. 2, according to a preferred embodiment of the invention, a first amperometric transformer, having a sensitivity suited to the operating voltages, is substantially positioned up against the socket 2, whilst a second amperometric transformer, more suited, instead, to low voltages, is positioned upstream of the device for connection/disconnection of the transformer 35 used for reducing the voltage to the socket 2 as indicated hereinafter in the description. In this way, via the monitoring action of two sensors appropriately positioned, a signal representing the current is supplied that provides the best description of the actual intensity of current circulating in the branch of electrical network 100. According to the invention, the monitoring means 10 advantageously comprise also a first module 12 for conversion and filtering of said first signal, and a second module 13 specifically dedicated for recognition of the presence/absence of the applied load.

Figure 1:
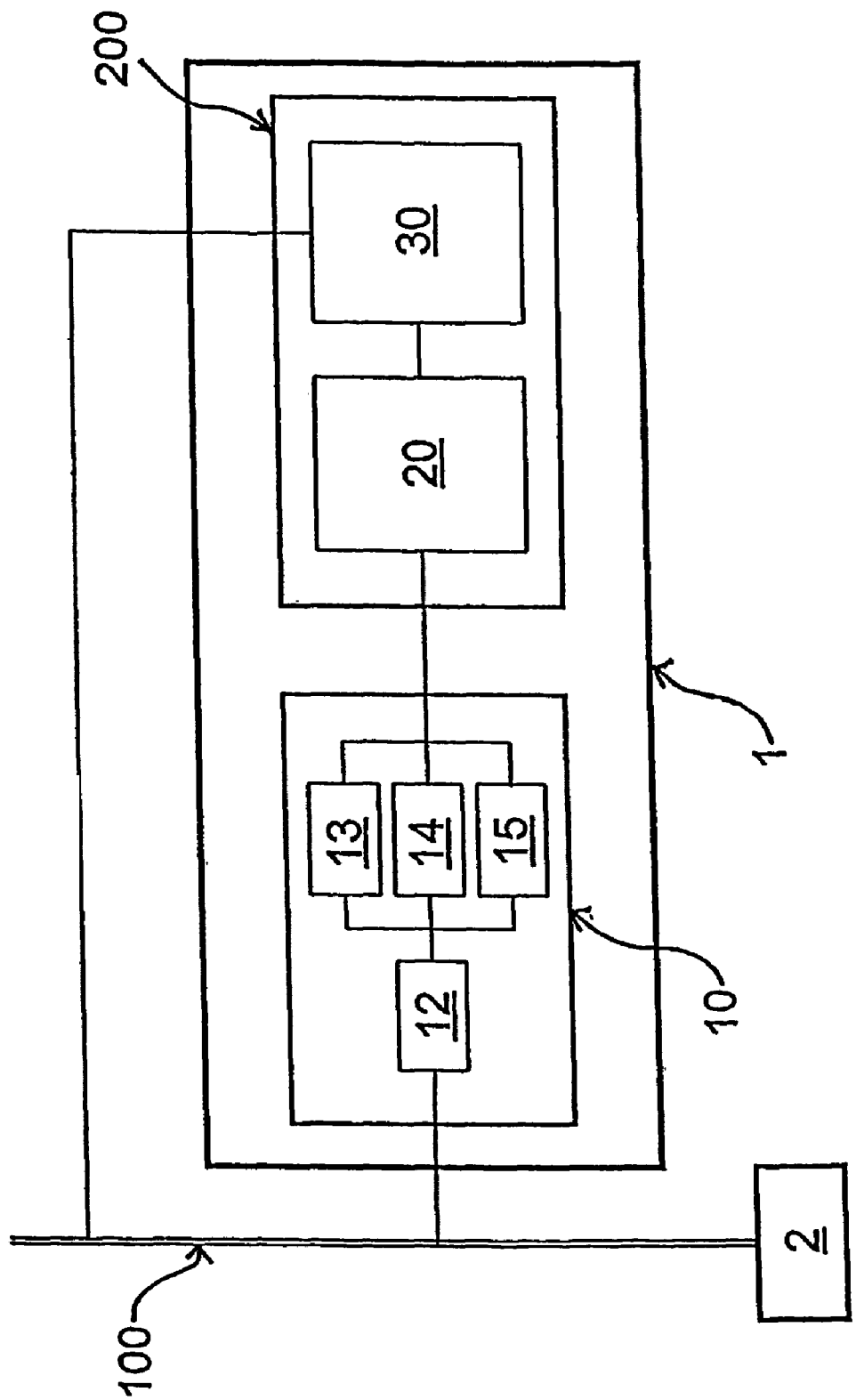
FIG. 1 is a block diagram of a device for the management of electrical sockets according to the invention.

The first module 12 is connected at input to the current sensor means 11 and performs a filtering and a conversion of the first signal from a.c. to d.c. to obtain in this way at output a second filtered signal, which is more stable but, in any case, represents the current circulating in the branch 100 of the electrical network. The second module 13, as may be seen from FIG. 1, is connected at input to the output of the first module 12 and supplies at output a third signal representing precisely the presence/absence of a load applied to the socket 2. Through the second module 13, a current measurement is, in this way, converted into a signal representing a condition of state of the load.

In particular, according to a preferred embodiment, the second module 13 comprises means for analysis of the level of intensity of the second filtered signal, which supply said third signal, indicating the presence/absence of the load, analysing whether the level of intensity of the second filtered signal is, respectively, higher/lower than a pre-set value. The pre-set value is also in this case chosen via appropriate evaluation of the safety conditions. If, for example, a limit value of 100 mA is chosen, a level of intensity of the second filtered signal higher than this limit indicates a condition of presence of load and a voltage requirement equal to the operating voltage, for example 220 V. A lower level indicates, instead, a condition of absence of load and hence a need to reduce the voltage, for example to 24 V. This enables, in effect, a selection of the load to be made so as to prevent in any case the voltage from being brought to the operating value whatever the load applied.

The processing unit 20, again according to the invention, is connected at input to the output of said second module 13. According to the information contained in said third signal representing the presence/absence of the load, the processing unit 20 supplies instructions to the intervention unit 30 and, in particular, to the means for variation of the level of voltage contained therein. Said instructions comprise, in particular, a first control signal corresponding to the passage from a situation of presence of load to one of absence of load, and a second control signal corresponding, instead, to the opposite transition, i.e., from a situation of absence of load to one of presence of load.

The voltage-variation means, as may be seen from FIG. 2 or FIG. 3, decompose the branch 100 of electrical network into a first part 50 and a second part 51. Said voltage-variation means comprise a first device 31 for connecting/disconnecting the first part 50 to/from the second part 51 of branch of electrical network 100. The first part 50 remains connected to the rest of the electrical network, whilst the second part 51 remains instead connected to the socket. With reference again to the aforementioned FIGS. 2 and 3, said voltage-variation means then comprise a voltage transformer 35, the primary winding 40 of which is connected to said first part 50, whilst the secondary winding 41 is, instead, connected to the second part 51. Finally, said voltage-variation means comprise also a second device 33 for connecting/disconnecting the secondary winding 41 to/from the aforementioned second part 51.

The processing unit, according to the invention, through the first control signal, indicating the passage from a situation of presence of load to one of absence of load, issues a command to the intervention unit 30 for disconnecting, via the first device 31, the first part 50 of the branch 100 of electrical network from the second part 51, and, at the same time, issues a command via the second device 33 for connecting the secondary winding of the transformer 35 to the second part 51. In this way, through the first control signal, the operating voltage, for example 220 V, is removed from the socket and a low voltage is inserted, for example 24 V.

Through the second control signal, indicating the passage from a situation of absence of load to one of presence of load, there are, instead, carried out the reverse operations; i.e., the first part 50 is reconnected to the second part 51, and, at the same time, the secondary winding 41 of the transformer is disconnected from the second part 51. In practice, the normal operating voltage is restored to the socket 2.

The monitoring means 10, according to the invention, can also comprise means dedicated to the recognition of a state of overload. In particular, according to a preferred embodiment, the presence of a third module 14 is envisaged, connected at input to the first module 12 referred to above and designed to provide at output a signal representing the overload condition. In particular, for this purpose, the invention envisages that said third module 14 will comprise means for analysis of the level of frequency of the filtered signal representing the conditions of the branch 100 of the electrical network. These latter analysis means supply a signal representing a state of overload only when the level of frequency is higher, for a pre-set time interval, than a first pre-defined threshold level of frequency. A state of overload may, for example, be identified when, in a 220-V a.c. domestic network, the level of frequency of the second filtered signal persists for a time longer than 10 seconds at values higher than 450 Hz.

In a way similar to what has been described above, the processing unit is connected at input also to the output of the third module and can hence provide, to said -intervention unit 30, a third control signal corresponding to the onset of the state of overload, and a fourth control signal corresponding to ceasing of said condition.

Via the third control signal, the first device 31 is in fact activated, and the first part 50 is disconnected from the second part 51; at the same time, via activation of the second device 34, the secondary winding 41 of the transformer 35 is connected to the second part 51. When the state of overload ceases, the socket is, instead, brought back again to the operating voltage, and the low voltage is removed. This is enabled through activation of the first device 31, which reconnects the first part 50 to the second part 51, whilst the second device 34 disconnects the secondary winding 41 from the second part 51.

In a way similar to what is envisaged for a state of overload, a fourth module 15 may advantageously be inserted in the monitoring means 10 so that it is connected at input to the output of the first module 12, and is able to provide at output a signal representing a state of short circuit. As in the case of the third module 14, also the fourth module 15 comprises means for analysis of the level of frequency of the second filtered signal, which, in a way similar to what has been described above, supply a signal representing a state of short circuit only when the level of frequency detected is higher than a second pre-defined threshold level of frequency. In this case, a state of short circuit in a 220-V a.c. domestic network is characterized by a level of frequency of the second filtered signal in the region of 1 kHz and hence much higher than the one characterizing the overload condition.

The processing unit 20 is advantageously connected also to the fourth module 15, and in a state of short circuit thus supplies at output a fifth control signal which, once it is sent to the intervention unit 20, enables actuation of the voltage-reduction means in order to remove any supply to the socket. In particular, the device 31 disconnects the first part 50 from the second part 51, and, at the same time, the second device 34 disconnects the secondary winding 41 from the second part 51.

The short circuit requires resetting of the device 1 in so far as it certainly represents the most drastic condition for which any supply to the socket must necessarily be removed.

From what has been set forth above, it appears clearly how one of the advantages of the present invention is to carry out a cyclic and continuous monitoring of the conditions of the load. This enables an automatic adjustment of the voltage to the socket and possibly requires an external intervention only in a short-circuit condition. The monitoring means 10, according to the invention, are positioned in close proximity to the contacts of the socket 2 so as to detect the effective conditions of operation of the socket. The signals processed by the second module 13, the third module 14, and the fourth module 15 are sent to the processing unit 20, which can, instead, be located even at a remote distance from the socket 2. Advantageously, this solution enables also processing on the same unit and at the same time of the information coming from a number of sockets located in different positions of the network. The intervention unit can be, for example, positioned in the proximity of the connector blocks of domestic networks and hence also remotely controlled by the processing unit 20. In this way, for example, the voltage reduction causes a considerable reduction in the electromagnetic emissions not only in the proximity of the socket 2 but also along all the branch 100 of electrical network.

According to the invention, moreover, the monitoring means 10 can also be integrated with means dedicated to the recognition of ground faults, as well as with other means designed, instead, to signal onset of a situation of presence/absence of the load or else of a state of short circuit or overload.

The present invention, in fact, envisages also the possibility of providing an electrical socket comprising the monitoring means 10 according to what has been described and further comprising signalling means, such as warning lights and/or acoustic alarms set on the outside of the socket itself. Said signalling alarms are designed to indicate the state of the socket and hence the conditions of the applied load.

According to a particularly preferred embodiment, the device of the invention also comprises means for detecting a possible contact of a person with a socket or other live parts. In particular, according to such embodiment, the device of the invention comprises means for maintaining, on a socket with no load applied, a very low safety voltage having sinusoidal waveform and a frequency of about 10 kHz. Said voltage signal is generated by an appropriate oscillator connected to the branches of the circuit through a transformer having suitable characteristics. Said signal, as a consequence of its frequency and thanks to the characteristics of a human body, allows to detect the accidental contact of a person with a socket without being dangerous or harmful for human beings.

The technical solutions adopted for the device for managing of electrical sockets enables the tasks and purposes set forth to be fully achieved. In particular the management device enables monitoring of the presence/absence of a load as well as possible situations of short circuit and overload. According to this information detected, the device enables a variation of the level of voltage to the socket guaranteeing in this way appropriate conditions of safety and enabling, in the absence of applied load, a reduction in the electromagnetic emissions of the wiring system.

The device for managing electrical sockets thus conceived may undergo numerous modifications and variations, all falling within the context of the inventive idea. Furthermore, all the items may be replaced by other technically equivalent ones. In practice, the materials used, as well as the dimensions and shapes, may be any according to the requirements and the state of the art.

The invention claimed is:

1. A device for the management of electrical sockets connected to a branch of an AC electrical network, the device comprising:
   a monitor circuit arranged to detect a presence or absence of a load connected to one of the sockets; and
   a voltage level management circuit connected to said branch of the AC electrical network, the voltage management circuit comprising:
   a processing unit that processes information provided by said monitor; and
   an intervention unit coupled to said branch of the AC electrical network and controlled by said processing unit, said intervention unit comprising means for varying an AC voltage level in response to the load.

2. The device of claim 1, wherein said monitor circuit comprises:
   a current sensor that produces a first signal representing a current circulating in said branch of the AC electrical network; and
   means for recognizing the presence or absence of the load.

3. The device of claim 2, wherein said current sensor comprises at least one amperometric transformer.

4. The device of claim 2, wherein said monitor circuit comprises:
   a first module that converts and filters said first signal; and
   a second module that recognizes the presence/absence of the load connected to said one of the sockets,
   said first module being connected at an input thereof to said current sensor and supplying, at a first output, a second signal representing a current circulating in said branch of the AC electrical network,
   said second module being connected at an input thereof to said first module and supplying, at a second output, a third signal representing the presence/absence of the load applied to said one of the sockets.

5. The device of claim 4, wherein said second module comprises means for analyzing an intensity level of said second signal.

6. The device of claim 5, wherein said means for analyzing supplies said third signal responsive to detecting a current level that is either higher or lower than a pre-set value.

7. The device of claim 4, wherein said monitor circuit comprise a fourth module configured to recognize a short circuit condition, said fourth module being connected at an input thereof to said first module and supplying, at a fourth output, a signal representing a short circuit condition.

8. The device of claim 7, wherein said fourth module comprises means for analyzing a frequency of said second signal.

9. The device of claim 8, wherein said means for analyzing generates a signal representing a short circuit condition in response to detection of a frequency greater than a second pre-defined threshold level.

10. The device of claim 7, wherein an input of said processing unit is coupled to said fourth module, said fourth module supplying a fifth control signal to the intervention unit in response to a detection of an onset of a short circuit condition.

11. The device of claim 10, wherein the first device disconnects said first part from said second part, and the second device disconnects a secondary winding of a voltage transformer in the intervention unit from said second part in response to the fifth control signal.

12. The device of claim 1, wherein an input of said processing unit is operatively coupled to an output of said monitor circuit, and said processing unit supplies, to said intervention unit, a first control signal corresponding to a transition from a load to a no load condition, and a second control signal corresponding to another transition from the no load condition to the load condition.

13. The device of claim 1, wherein said intervention unit comprises:
   a first device that connects/disconnects a first part to/from a second part of said branch of the AC electrical network, said first part being connected to a portion of the branch, and said second part being connected to said one of the sockets;
   a voltage transformer having a primary winding connected to said first part and a secondary winding connected to said second part; and
   a second device that connects/disconnects said secondary winding to/from said second part.

14. The device of claim 13, wherein, responsive to a first control signal from the processing unit, the first device disconnects said first part from said second part and the second device connects said secondary winding to said second part.

15. The device of claim 13, wherein, responsive to a second control signal from the processing unit, the first device connects said first part to said second part and the second device disconnects said secondary winding from said second part.

16. The device of claim 13, wherein, responsive to a control signal from said processing unit, the first device disconnects said first part from said second part, and said second device connects a secondary winding to said second part.

17. The device of claim 1, wherein said monitor comprises an overload recognition circuit.

18. The device of claim 17, wherein said overload recognition circuit comprises a third module operatively arranged to recognize a state of overload, said third module being connected at an input thereof to said first module and supplying, at a third output, a signal representing the state of overload.

19. The device of claim 18, wherein said third module analyzes a frequency of a second signal representing a current circulating in said branch of the AC electrical network.

20. The device of claim 19, wherein said third module supplies said signal representing the state of overload when a detected frequency is higher than a first pre-defined threshold level for a pre-defined time interval.

21. The device of claim 18, wherein an input of said processing unit is connected to said third module and supplies, to said intervention unit, a third control signal corresponding to an onset of a state of overload, and a fourth control signal when said state of overload ceases.

22. The device of claim 21, wherein, responsive to said fourth control signal, a first connection/disconnection device connects a first part of said AC electrical branch to a second part of said AC electrical branch, and a second device disconnects a secondary winding of a voltage transformer in the intervention unit from said second part.

23. The device of claim 1, wherein said monitor circuit comprises means for recognizing a short circuit condition.

24. The device of claim 1, wherein said monitor circuit comprises means for recognition of a ground fault.

25. The device of claim 1, further comprising means for signaling the presence or absence of at least one of a load, an overload condition, and a short circuit condition.

26. The device of claim 1, further comprising means for detecting contact of a person with said one of the sockets or other powered portion of the branch of the AC electrical network.

27. The device of claim 1, further comprising means for maintaining, on a socket with no load applied, a safety voltage having a sinusoidal waveform and a frequency of about 10 kHz.

28. A domestic type electrical socket, comprising the device for the management of electrical sockets connected to a branch of an AC electrical network of claim 1, and means for signaling at least one of a presence or absence of a load, an overload condition, and a short circuit condition.

29. The socket of claim 28, further comprising at least one of a warning light and an acoustic alarm.

30. A method of using the device of claim 1, to manage electrical sockets connected to a branch of an AC electrical network, the method comprising:

using the monitor circuit to monitor a load condition and detect a presence of absence of a load on said one of the sockets; and process load condition information determined by said monitor circuit; and varying an AC voltage level provided to said one of the sockets in response to the load condition information.

31. A method of for managing electrical sockets connected to a branch of an AC electrical network, the method comprising:

monitoring a load condition and detecting a presence or absence of a load on said one of the sockets;

processing load condition information determined by said monitoring; and using an intervention unit coupled to said branch of the AC electrical network and controlled by an processing unit to vary an AC voltage provided to said one of the sockets in response to the load condition.

* * * * *